United States Patent [19]
Somerset

[11] 3,860,826
[45] Jan. 14, 1975

[54] X-RAY CASSETTE
[75] Inventor: James H. Somerset, Syracuse, N.Y.
[73] Assignee: Biomechanics, Inc., Syracuse, N.Y.
[22] Filed: Feb. 28, 1973
[21] Appl. No.: 336,407

[52] U.S. Cl. .............................. 250/480, 250/475
[51] Int. Cl. .......................................... G03b 41/16
[58] Field of Search .................... 250/480, 481, 475

[56] References Cited
UNITED STATES PATENTS
| 2,371,843 | 3/1945 | Powers | 250/480 |
| 2,566,266 | 8/1951 | Uhle et al. | 250/480 |
| 3,327,115 | 6/1972 | Bartlett | 250/480 |
| 3,569,700 | 3/1971 | Quinn | 250/480 |

Primary Examiner—Archie R. Borchelt
Assistant Examiner—B. C. Anderson
Attorney, Agent, or Firm—Pennie & Edmonds

[57] ABSTRACT

An X-ray cassette is disclosed having a front and back plate with means for securing the front and back plates together. On the inside of each plate a fluorescent screen is mounted over a resilient material such as foam rubber. A plurality of holes extend through the back plate which provide a means of communication between the foam rubber material and the exterior of the back plate. A source of pressurized air is connected to the back plate over the holes. When the X-ray film is positioned in the cassette and the cassette plates are locked together, air under pressure is introduced into the foam rubber portion of the back plate of the cassette through the holes therein, thereby forcing the X-ray film tightly against the fluorescent screen on the front plate of the cassette. This insures that the film is flat against the front plate and, hence, orthogonal to the direction of the X-rays and in intimate contact with the fluorescent screens.

2 Claims, 3 Drawing Figures

PATENTED JAN 14 1975    3,860,826

X-RAY CASSETTE

BACKGROUND OF THE INVENTION

This invention relates to an improved X-ray cassette.

In the past, X-ray cassettes have been developed which had a front plate and a back plate between which was interposed an X-ray film. A resilient material such as foam rubber was usually positioned on the inside surfaces of the plates which served to position the X-ray film such that it would not bend or fold within the cassette. With such a structure, the X-ray film was supposedly positioned with its plane orthogonal to the incident X-rays. However, because of manufacturing tolerances and the aging characteristics of the foam rubber, the X-ray film was often not firmly sandwiched between the fluorescent screens which defined the internal walls of the X-ray cassette. Accordingly, the film was often not snugly positioned within the cassette so that the film could not bend or fold.

It, therefore, is an object of this invention to provide an X-ray cassette wherein the X-ray film is tightly positioned in the cassette so that it cannot bend or fold and so that it is in intimate contact with the fluorescent screens.

SHORT STATEMENT OF THE INVENTION

Accordingly, this invention relates to an X-ray cassette having a front and back plate with each plate having a resilient material such as foam rubber secured thereto. A fluorescent screen is positioned over the resilient material. When the plates are secured together the X-ray film is sandwiched between the two fluorescent screens. A plurality of holes extend through the back plate of the X-ray cassette through which air under pressure enters and forces the resilient material and the fluorescent screen associated with the back plate tightly against the front plate, thereby securing the X-ray film securely in place so that it cannot bend or fold and so that it is in intimate contact with the fluorescent screens.

BRIEF DESCRIPTION OF THE DRAWINGS

Other objects, features, and advantages of this invention will be more fully understood from the following detailed description, appended claims and the accompanying drawing in which:

DETAILED DESCRIPTION OF THE PREFERRED EMBODIMENT

Figure 1:
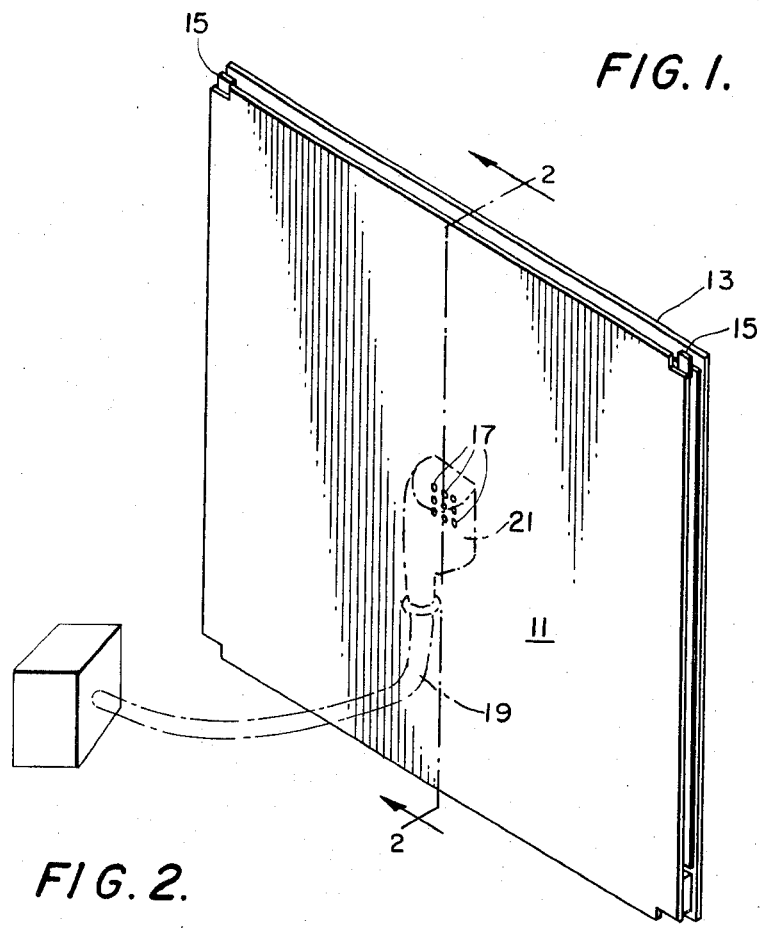
FIG. 1 is a perspective view of the X-ray cassette of this invention.

Refer now to Fig. 1 where there is shown a perspective view of the X-ray cassette of this invention. A back plate 11 is shown secured to a front plate 13 by means of a partially shown latch mechanism 15. The latching mechanism may be of any suitable type known in the art and is not considered a part of the invention disclosed herein. As shown the front and back plates 13 are generally planer in configuration and are suitably dimensioned to hold an X-ray for exposure. On the back plate 11 there is shown a plurality of holes 17 for permitting communication of a gas, such as air, under pressure between the interior of the cassette and the exterior thereof. A source of gas under pressure 20 is connected to the cassette by means of a flexible pipe 19 which is terminated in a head portion 21. The pipe 19 and head 21 may be of any suitable type, configuration, and material known in the art. Preferably, the head 21 should be attached to the back plate by means of a suction cup arrangement so that the head is easily attached to and removed from the plate.

Figure 3:
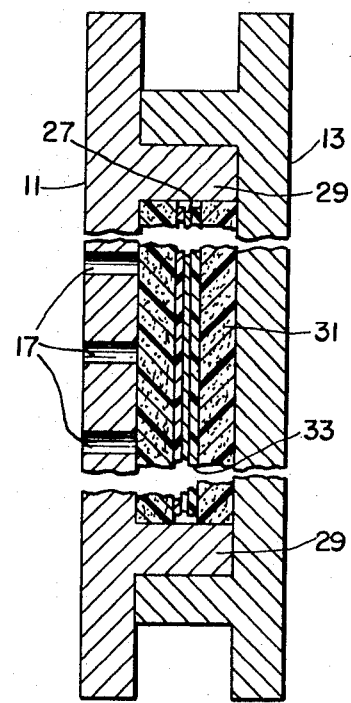
FIG. 3 shows a partial sectional view taken along the lines 2—2 of FIG. 1 showing the X-ray cassette with film therein.

Refer now to FIG. 3 which shows a partial sectional view of the back plate 11 taken along the 2—2 of FIG. 1. As shown back plate 11 has a plurality of holes 17 therethrough for permitting the communication of a gas such as air between the exterior and interior thereof. Mounted over the inside of the back plate 11 is a resilient material 23 such as foam rubber. The foam rubber is secured to the back plate about its external periphery with the interior portions thereof being free to move away from the plane of the back plate. Positioned over the foam rubber is a fluorescent screen 25 which enhances the exposure of the X-ray film 27. The X-ray film is positioned next to the fluorescent screen 25. End walls 29 prevent light radiation from entering the interior of the X-ray cassette when the X-ray film is being exposed.

When air under pressure enters the interior of the cassette through holes 17, the foam rubber 23 expands forcing the fluorescent screen 25 and X-ray film 27 to the right. This may be best seen in Fig. 3, which is a section view showing the X-ray film 27 positioned in the X-ray cassette which is in a latched condition. Rear plate 11 is shown secured to front plate 13 as aforementioned by a suitable latching means. The front plate 13 has a foam rubber mat secured to the inside thereof over which is positioned a fluorescent screen 33. As aforementioned back plate 11 has a foam rubber material 23 positioned over the interior surface thereof to which is secured a fluorescent screen 25. The X-ray film is positioned between the two fluorescent screens 25 and 33. Once the front and back plates are secured together, air under pressure is introduced through holes 17 thereby forcing the foam rubber mat 23 to expand which in turn forces fluorescent screen 25 and the film 27 firmly against the fluorescent screen 33 of the front plate. Thus, the X-ray film does not wrinkle or fold and is firmly and immovably positioned within the cassette despite background vibrational movement of the cassette. Once the film has been exposed to the X-rays, the pressurized air is released thereby permitting the foam rubber material and the fluorescent screen to pull back from the fluorescent screen of the front plate.

Figure 2:
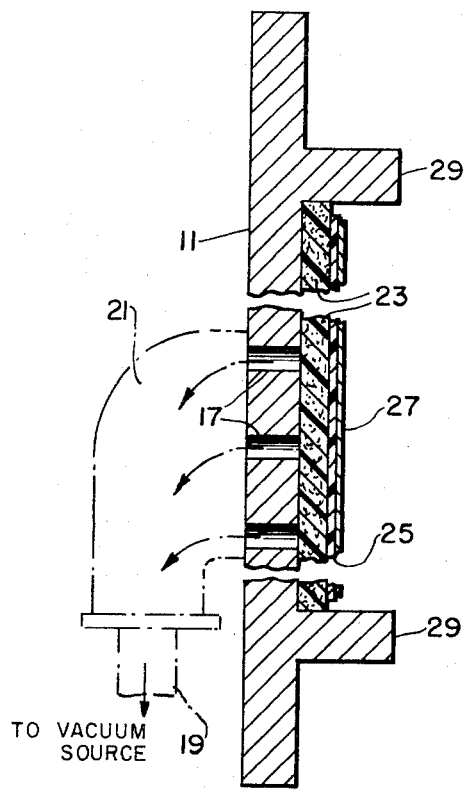
FIG. 2 is a partial cut-away view taken along the lines 2—2 of the FIG. 1 showing holes through the back plate through which vacuum can be applied to resilient material in the cassette.

As an alternate embodiment a vacuum may be created within the cassette through holes 17 at the time of separation of the front and back plates after exposure of the film as best shown in FIG. 2. This shows air being removed from the resilient means through holes 17 by suction caused by vacuum applied through pipe 19 and head portion 21. This facilitates removal of the X-ray film from the interior of the chamber formed by the cassette.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined by the appended claims.

What is claimed is:

1. In a cassette for taking X-ray radiographs including a front plate and back plate defining an interior chamber, at least one fluorescent screen positioned in the interior chamber of the cassette, and wherein an X-ray film is adjacent said fluorescent screen in said interior chamber, the improvement comprising, a plurality of holes through said back plate, a resilient foam material capable of expanding and contracting positioned over the interior surface of said back plate to act on said fluorescent screen and X-ray film, and means for passing pressurized gas through said holes or creating a suction through said holes, said holes extending from the exterior of the cassette to said resilient foam material and said fluorescent screen positioned between said resilient foam material and said X-ray film.

2. The cassette of claim 1 including a second resilient foam material positioned over the interior surface of said front plate and a second fluorescent screen positioned between said second resilient form material and said X-ray film.

* * * * *